May 27, 1930.    O. A. ROSS    1,759,917
SEAL
Filed June 25, 1927

INVENTOR
Oscar. A. Ross,

Patented May 27, 1930

1,759,917

UNITED STATES PATENT OFFICE

OSCAR A. ROSS, OF NEW YORK, N. Y.

SEAL

Application filed June 25, 1927. Serial No. 201,391.

This invention relates to seals and more particularly to that class of seals comprising a cap or cover of unit structure to be attached to the heads of fasteners, as for example screws, or bolts, or similar fasteners after said fasteners have been finally secured to place.

One of the prime objects of this invention is to provide an ornamental seal comprising a one piece seal of low cost for covering the heads of screws and bolts, or nuts and bolt ends, or similar protrusions.

Another object is to furnish a seal for the heads of screws and bolts, or bolt ends and nuts, or similar fasteners employed for securing building, or other hardware, or articles, whereby the removal of same by theft is made more difficult.

Another object is to furnish an ornamental covering for screws, bolts, nuts, or similar fasteners, whereby ordinary low cost fasteners may be employed at all points, whereas the coverings may be selected as to finish of the particular hardware, or article to be secured by said ordinary fasteners.

Another object is to furnish a seal, or covering for fasteners upon which a monogram may be stamped to represent the particular manufacturer, or abode, or article, to which said fasteners are affixed.

Another object is to furnish a covering, or seal for fasteners which may be shaped in form to best suit the design of the particular article, abode, or contour to which the fastener is affixed.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of this instrument wherein patentable novelty is claimed for certain and peculiar features of the device, it being understood that within the scope of what hereinafter thus is claimed, divers changes in the form, proportions, size and minor details of the structure may be made without departing from the spirit of, or sacrificing any of the details of the invention.

In describing the invention in detail, reference is had to the accompanying drawings, wherein I have illustrated embodiments of my invention, and, wherein like characters of reference, designate corresponding parts throughout the several views, and, in which:—

Figure 1:
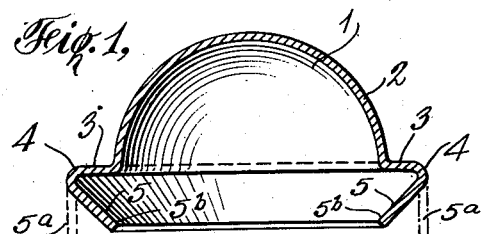
Figure 6:
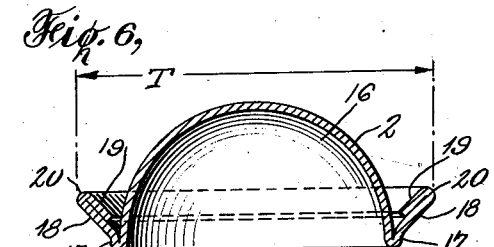
Figure 2:
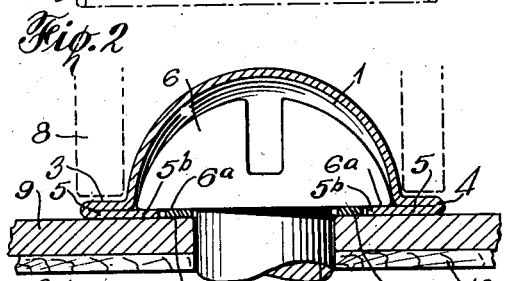
Figure 7:
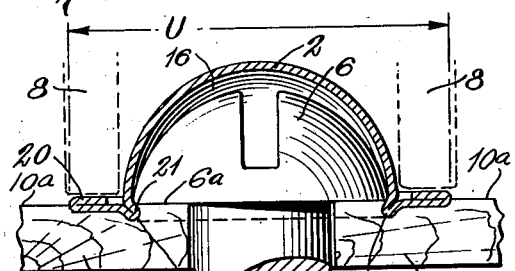
Figure 3:
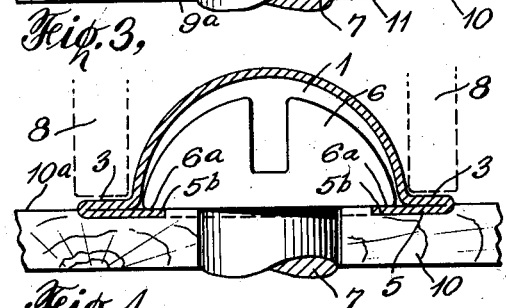
Figure 8:
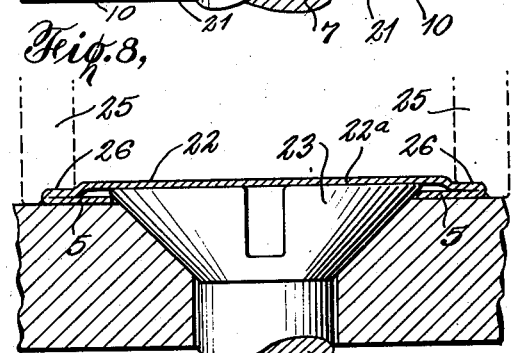
Figure 4:
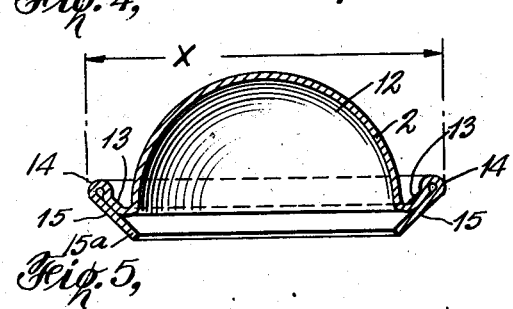
Figure 9:
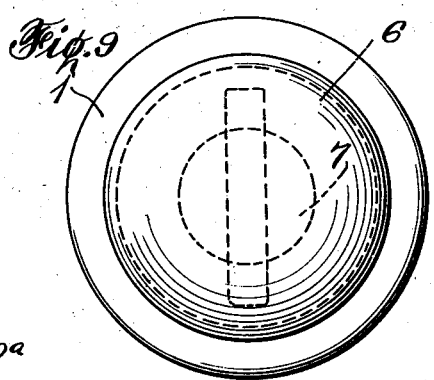
Figure 5:
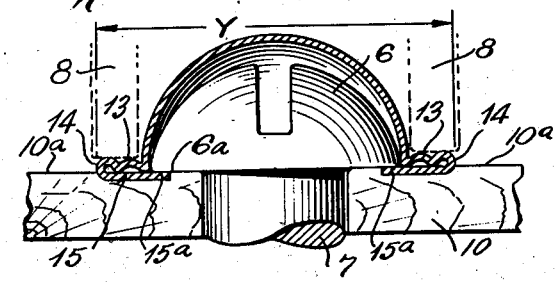

Figure 1, is a sectional view of one form of seal before application to a fastener, and, Figure 2 is a part sectional, part elevational view of the same seal as applied to a fastener, the head of which impinges upon a metal surface, and, Figure 3, is a similar view of a similar seal as applied to a fastener, the head of which impinges upon a wood, or other semi-soft surface, and, Figure 4 is a sectional view of a modified form of seal before application to a fastener, and, Figure 5 is a part sectional, part elevational view of the same seal as applied to a fastener, the head of which impinges upon a wood, or other semi-soft surface, and, Figure 6 is a sectional view of another modified form of seal, and Figure 7 is a part sectional, part elevational view of the same seal as applied to a fastener, the head of which impinges upon a wood, or other semi-soft surface, and, Figure 8 is another modified form of seal as applied to a flat headed fastener, and Figure 9 is a top elevational view showing the general contour of seals shown in Figures 1 to 8 inclusive after application to the head of a fastener.

Referring to Figs. 1, 2 and 3, the seal 1, is formed from a metal blank and comprises the formed cap, crown or cover portion 2, the base of which adjoins a flat annular portion 3, the outer edge of which adjoins the annular torically formed portion 4, the lower edge of which adjoins the downwardly diagonally extending locking rim 5 having locking tongue 5$^b$. The seal as 1, is completely formed in two operations, the first forming portions 2 and 3 as shown by the solid lines in Fig. 1, and portion 5 as shown by the dotted portion 5$^a$. The second operation comprises reforming portion 5$^a$ by preferably rolling or spinning portion 5$^a$ inwardly to form the frustro conical locking rim 5 as shown by solid lines in Fig. 1.

When the head 6 of a fastener, as 7 is to be sealed, a seal as 1, is placed over said head whereafter it is applied with a tool as 8, comprising preferably a short length of steel tubing supplied with each package of seals.

Referring to Fig. 2, where a fastener as 7 is employed to secure as for example, a metal building hardware piece as 9, to a wood framing as 10, a washer 11 is placed between the impinging surface 6ª of head 6 and the surface 9ª of metal plate 9 as shown in Fig. 2, or the fastener is backed off sufficiently to provide the annular space ordinarily provided by the washer 11. As the tool 8 is driven downwardly the annular section 3 is also restrained downwardly whereby the tongue 5ᵇ of locking rim 5 is restrained to pass under the impinging surface 6ª of head 6 and between said surface and surface 9ª of metal plate 9, in this manner effecting a seal over the head 6 of screw or fastener 7. As the locking rim 5 is restrained to pass between the surfaces 6ª and 9ª, it becomes corrugated radially, in this manner forming an effective lock between said surfaces.

Referring to Fig. 3, when a seal as 1 is applied to the head 6 of a fastener as 7, the impinging surface 6ª of which impinges on a semi-soft surface as for example wood the washer 11, is omitted as it is found the tongue 5ᵇ of locking rim 5 will dig into the surface 10ª and will also be restrained to pass under the impinging surface 6ª of head 6 and become wedged between said surface and the surface 10ª in this manner securely locking seal 1 onto head 6 of fastener 7 as shown in Fig. 3.

Referring to Figs. 4 and 5, the seal 12 is formed from a metal blank and comprises the formed cap or crown portion 2, the base of which adjoins the frustro conical annular portion 13 the outer edge of which adjoins the annular torically formed portion 14, the outer edge of which adjoins another frustro conical locking portion 15 having tongue 15ª adapted to impinge under the head 6 of fastener 7 when applied thereto.

Seal 12 is also formed complete as shown, in two operations, the first comprising a stamping operation substantially the same as that required to form seal 1, first operation, after which the portions 13, 14 and 15 are rolled or spun inwardly and upwardly to the frustro conical form shown by Fig. 4. This second operation may also be accomplished by stamping if preferred.

Referring to Fig. 5 when a seal as 12, is to be applied to a fastener head as 6, said seal is placed over said head after which a tool as 8 is driven downwardly on portion 14, until the seal is locked onto head 6 as shown in Fig. 5. As the tool 8 is driven downwardly the rim 14, and portions 13 and 15 are also restrained downwardly. It is found in practice that the portion 14 moves downwardly substantially in a vertical plane, the dimension Y of Fig. 5, being substantially the same as dimension X of Fig. 4. As a result the annular portion 13 is restrained inwardly and is caused to corrugate as shown in Fig. 5. As the tool 8 restrains rim 14 downwardly the tongue 15ª is forced under the head 6 and is firmly clamped between impinging surface 6ª and the surface 10ª of member 10 as shown in Fig. 5. If the seal as 12, were to be employed over a fastener head as 6, impinging on a metal surface, a washer, as 11, would be employed as shown in Fig. 2.

Referring to Figs. 6 and 7, the seal 16 is formed from a round metal blank and comprises the cap or crown portion 2, the base of which adjoins a vertically upturned portion 17, the upper edge of which adjoins the frustro conical portion 18, the upper edge of which adjoins the downwardly extending similar portion 19, the portions 18 and 19 forming the flange 20 of the seal 16. The vertical portion 17 and the base of cap portion 2 form a locking rim 21. In forming seal 16, the first stamping operation forms the cap 2 as shown, the portions 17 and 18 in a continuous horizontal plane, and the portion 19 extending vertically upwardly. In the next operation the portion 19 is preferably rolled or spun inwardly to form flange 20 and thereafter said flange is preferably rolled, or spun diagonally upwardly to form the finished seal as shown in Fig. 6.

Referring to Fig. 7 when a seal as 16 is to be attached to a fastener head as 6, said seal is placed over said head whereafter a tool as 8, is driven downwardly on flange 20 until the seal 16 is locked onto the head 6, as shown in Fig. 7. As the tool 8 is driven downwardly the locking tongue 21 is depressed into the surface 10ª whereafter continued downward movement of tool 8 causes flange 20 to move downwardly. As this last named movement occurs the flange 20 resists movement outwardly and as a result the locking tongue 21 is restrained inwardly against and under the outer edge of head 6 as shown in Fig. 7, in this manner securely attaching seal 16 to head 6.

Referring to Fig. 8, the flat head seal 22 is of substantially the same locking structure as seal 1 of Figs. 1, 2 and 3, except that the cap portion 22ª is flat and in a plane with the annular flat portion 3. For attaching seal 22 over the flat head 23 of fastener 24, a tool as 25 is employed, similar to tool 8, except that a recess 26 is formed in the lower end for the purpose of allocating the tool 25 onto seal 22 before locking said seal into place on head 23.

Figure 9 illustrates substantially, a top view of any one of the seals shown in Figs. 1 to 8 inclusive after it has been applied to a fastener as 7 or 23.

Whereas only roundheaded and flat headed seals have been shown it is obvious that many other shapes may be employed, some of which are illustrated in my co-pending application Ser. No. 181,810 filed Apr. 7th, 1927.

What I claim is:—

1. An article adapted to be applied to the exposed portion of a removable fastener for preventing molestation thereof which comprises; a cap portion arranged to form an enclosure for the exposed portion of the fastener, an annular portion surrounding the cap portion, an inverted frustro conical portion joined to the annular portion, the frustro conical portion being constrained to enter an annular space between the surface of the substructure into which the fastener is inserted and the upper portion of the fastener to form a seal therebetween.

2. An article arranged to be secured to the exposed portion of a removable fastener which comprises; a head portion arranged to conceal the exposed portion of the fastener, a frustro conical annular portion surrounding the head portion, and an intermediate portion formed at the base of the head portion for joining the frustro conical annular portion and the head portion together to form the seal.

3. An article arranged to be applied to the exposed portion of a removable fastener which comprises; a head body portion arranged to conceal the exposed portion of the fastener, a substantially flat annular body portion the inner circumferential portion of which is joined to the outer circumferential portion of the head body portion and a frustro conical annular body portion the outer circumferential portion of which is joined to the outer circumferential portion of the flat annular body portion.

4. An article arranged to be applied to the exposed portion of a removable fastener which comprises; a head body portion arranged to conceal the exposed portion of the fastener, an intermediate body portion the inner circumferential portion of which is joined to the outer circumferential portion of the head body portion, and a frustro conical annular body portion the outer circumferential portion of which is joined to the outer circumferential portion of the intermediate body portion.

5. An article of manufacture arranged to be applied to the exposed portion of a removable fastener after the fastener has been secured in place which comprises; a completely formed central body portion arranged to form the enclosure for the exposed portion of the fastener, and a frustro-conical semi-formed locking rim portion surrounding the completely formed body portion arranged to be completely formed as a portion thereof is constrained to enter between the exposed portion of the fastener and the surface of the substance into which the fastener is inserted.

6. An article of manufacture adapted to be applied to the exposed portion of a removable fastener with a tool which comprises, a completely formed central portion arranged to form the enclosure for the exposed portion of the fastener, and a semi-formed inverted frustro-conical portion surrounding the completely formed portion having a locking portion formed thereon arranged to be constrained to enter between the exposed portion of the fastener and the surface upon which the exposed portion normally seats as the semi-formed portion is completely formed with the tool for locking the article to the fastener.

In testimony whereof, he has signed his name to this specification this 22nd day of June, 1927.

OSCAR A. ROSS.